No. 850,028. PATENTED APR. 9, 1907.
A. MAJOR.
COOKER.
APPLICATION FILED NOV. 15, 1906.
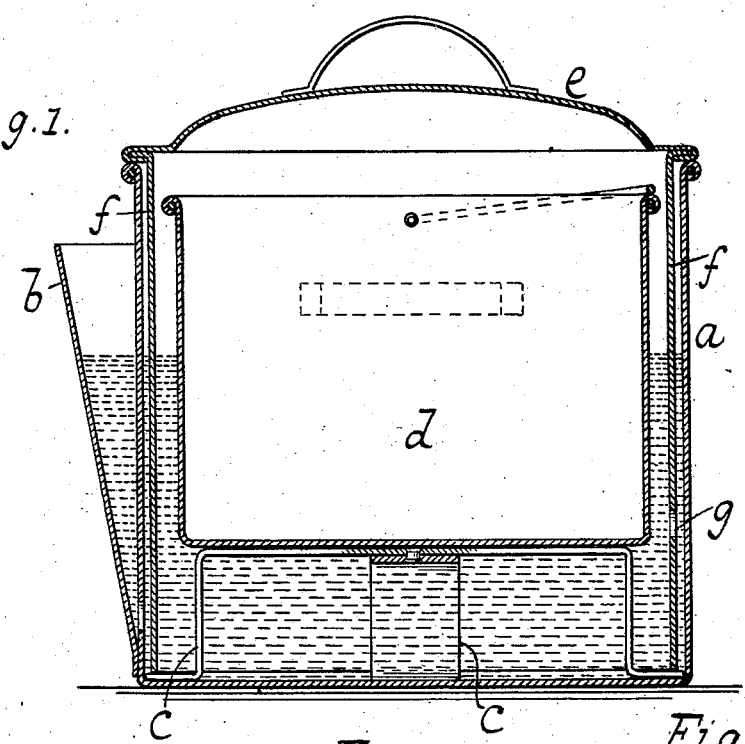
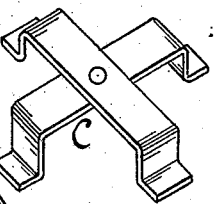
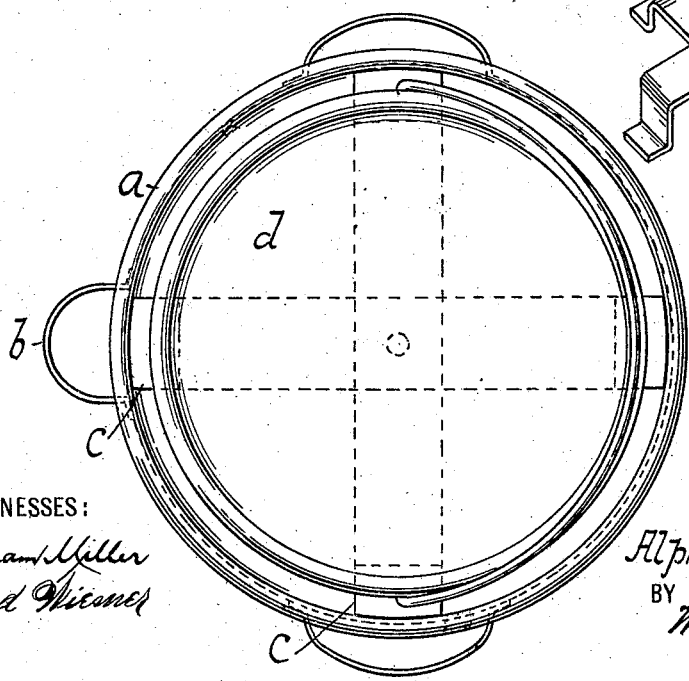
WITNESSES:
William Miller
Edward Wiesner
INVENTOR
Alphonse Major
BY
W. C. Hauff
ATTORNEY

UNITED STATES PATENT OFFICE.

ALPHONSE MAJOR, OF BROOKLYN, NEW YORK.

COOKER.

No. 850,028. Specification of Letters Patent. Patented April 9, 1907.

Application filed November 15, 1906. Serial No. 343,544.

*To all whom it may concern:*

Be it known that I, ALPHONSE MAJOR, a citizen of the United States, residing at Brooklyn, in the county of Kings and State of New York, have invented new and useful Improvements in Cookers, of which the following is a specification.

This invention relates to a cooker by which a downward pressure of steam is effected on the food being prepared; and the invention consists in the features of construction set forth in the following specification and claim and illustrated in the annexed drawings, in which—

Figure 1 is a sectional elevation of a cooker embodying this invention. Fig. 2 is a plan view, the cover being removed. Fig. 3 shows a spider.

In the drawings is shown a reservoir or outer vessel $a$, having a spout $b$. Into this vessel is placed a spider readily formed of two strips of material secured together acrosswise and each of ⊓ shape. Such spider $c$ has the lower outwardly-projecting terminal portions or feet made to fit the reservoir. A receptacle (shown at $d$) is adapted to sit on the spider.

A cover is shown at $e$, having a rim or flange $f$. When the cover is in place, the rim reaches down far enough to rest on the feet of the spider. The rim has a vent-hole, as seen at $g$.

The spout $b$ is made to reach up to about an inch from the wire or top bead or edge of the reservoir. The vent $g$ is placed about two inches from the bottom of the rim $f$. The spout $b$ enables the height of water to be ascertained from exterior inspection and also enables refilling, if required, without necessitating the removal of the cover.

This construction offers several advantages—for example, as the following: It confines the heat or increases temperature and expedites operation of cooking. It produces a downward pressure of steam, so as to cook the food from the top as well as the bottom. It prevents the thick part of the cereals being drawn to the bottom and packed by the heat or forming a solid mass, thus avoiding necessity of stirring. This is of importance, as the cereals should not be stirred while cooking, as such stirring makes the product mushy or sloppy. By having the heat at top the cooking is perfectly even and the cooked cereals are light and of tasty flavor. In other words, the flavor is preserved or retained. By this device fresh supply of steam is constantly supplied to the food. The steam generated cannot escape until it has raised the cover sufficiently to raise the vent above the water. The consequent pressure acting upon the food in the receptacle produces satisfactory results, such pressure, as noticed, acting directly upon the food and with considerably elevated or increased temperature. The depending rim $f$ of the cover, in connection with the wall of reservoir $a$, forms a double wall against the outside air or influence. The steam is generated more rapidly and fuel consequently saved, and the operation is expedited. Such cover remains in place until there exists a surplus of pressure enough to raise the cover.

I claim—

In a cooker, the combination of an outer and inner vessel, the latter of decreased size so as to fit freely within the outer vessel, a spider at the interior of the outer vessel and having feet supported by the bottom thereof for holding the inner vessel elevated from the bottom of the outer vessel and a cover made to sit on and close the top or mouth of the outer vessel and having a circular depending flange of greater diameter than the inner vessel and of less diameter than the outer vessel and extending to the bottom of the latter to form a water-space between the said outer vessel and flange, said flange having an opening forming communication between the interior of the outer vessel and the water-space formed by the flange.

In testimony whereof I have hereunto set my hand in the presence of two subscribing witnesses.

ALPHONSE MAJOR.

Witnesses:
EDWARD WIESNER,
W. C. HAUFF.